US010911574B2

(12) United States Patent
Pessis et al.

(10) Patent No.: US 10,911,574 B2
(45) Date of Patent: Feb. 2, 2021

(54) USING MULTIPLE PROTOCOLS IN A VIRTUAL DESKTOP INFRASTRUCTURE

(71) Applicant: Amazon Technologies, Inc., Seattle, WA (US)

(72) Inventors: David Pessis, Seattle, WA (US); Nelamangal Krishnaswamy Srinivas, Sammamish, WA (US); Hakimuddin Hanif, Redmond, WA (US); Eugene Michael Farrell, Sammamish, WA (US); Deepak Suryanarayanan, Bellevue, WA (US); Varun Verma, Newcastle, WA (US); Erik Jonathon Tellvik, Renton, WA (US); Nathan Bartholomew Thomas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 201 days.

(21) Appl. No.: 14/668,543

(22) Filed: Mar. 25, 2015

(65) Prior Publication Data

US 2016/0286003 A1 Sep. 29, 2016

(51) Int. Cl.
*H04L 29/06* (2006.01)
*G06F 9/54* (2006.01)
(Continued)

(52) U.S. Cl.
CPC .............. *H04L 67/42* (2013.01); *G06F 9/541* (2013.01); *G06F 9/45558* (2013.01);
(Continued)

(58) Field of Classification Search
CPC .............. G06F 17/30; G06F 17/30011; G06F 17/30014; G06F 17/30017;
(Continued)

(56) References Cited

U.S. PATENT DOCUMENTS 7,984,130 B2 7/2011 Bogineni et al.
8,856,860 B2 10/2014 Grayson et al.
(Continued)

FOREIGN PATENT DOCUMENTS

JP 2013-243538 A 12/2013
WO WO 2014/096660 A1 6/2014
(Continued)

OTHER PUBLICATIONS

International Search Report and Written Opinion from PCT/US2016/023633, dated May 11, 2016, 12 pages.

(Continued)

*Primary Examiner* — Younes Naji
*Assistant Examiner* — Da T Ton
(74) *Attorney, Agent, or Firm* — Klarquist Sparkman, LLP

(57) ABSTRACT

A method for selecting a communication protocol for a virtual desktop instance in a service provider environment may include providing to a client computing device, access to a virtual desktop instance running on a server computer using a first communication channel associated with a first communication protocol. A request for functionality from a user of the device is detected, the requested functionality being unsupported by the first communication protocol. A second communication protocol from a plurality of available communication protocols may be selecting based on the requested functionality. The second communication protocol may support the requested functionality. A user authorization for using the second communication protocol can be verified. Upon successful verification, a second communication channel is established between the server computer and the device using the second communication protocol for performing the functionality, while maintaining access to the (Continued)

virtual desktop instance using the first communication channel.

16 Claims, 9 Drawing Sheets

(51) Int. Cl.
   *G06F 9/455* (2018.01)
   *H04L 29/08* (2006.01)
(52) U.S. Cl.
   CPC ...... *G06F 2009/4557* (2013.01); *H04L 67/08* (2013.01); *H04L 69/18* (2013.01)
(58) Field of Classification Search
   CPC ......... G06F 17/30023; G06F 17/30058; G06F 17/30194; G06F 17/30283; G06F 17/30386; G06F 17/30575; G06F 17/30861; G06F 17/30864; G06F 17/30867; G06F 17/03; H04L 51/10; H04L 61/2069; H04L 65/4069; H04L 65/60; H04L 67/02; H04L 67/06; H04L 67/104; H04L 2029/06054; H04L 65/4084; H04L 67/1002; H04L 41/00; H04L 41/02; H04L 41/08; H04L 41/082; H04L 41/0823; H04N 1/00156; H04N 1/00159; H04N 1/00161; H04N 1/00164; H04N 21/00; H04N 21/4622; H04N 21/64707; H04N 21/21; H04N 21/214; H04N 21/222; H04N 21/2221; H04N 21/2223; H04N 21/2225
   USPC .......................................... 709/217–220, 230
   See application file for complete search history.

(56) References Cited

U.S. PATENT DOCUMENTS

| | | | |
|---|---|---|---|
| 2010/0269152 A1* | 10/2010 | Pahlavan | G06F 9/4445 726/3 |
| 2011/0185068 A1* | 7/2011 | Schmieder | H04L 69/24 709/227 |
| 2011/0243553 A1 | 10/2011 | Russell | |
| 2012/0315852 A1 | 12/2012 | Husain et al. | |
| 2012/0317181 A1 | 12/2012 | Husain et al. | |
| 2012/0317183 A1* | 12/2012 | Husain | G06F 3/14 709/203 |
| 2012/0331300 A1* | 12/2012 | Das | G06F 3/1454 713/176 |
| 2014/0229608 A1 | 8/2014 | Bauer et al. | |
| 2014/0280959 A1 | 9/2014 | Bauer et al. | |
| 2015/0006748 A1* | 1/2015 | Kashou | H04L 69/08 709/230 |
| 2015/0142981 A1* | 5/2015 | Gonzales | H04L 67/142 709/227 |
| 2015/0373148 A1* | 12/2015 | He | H04L 67/34 709/203 |
| 2016/0198021 A1* | 7/2016 | Mooney | H04L 69/24 370/467 |

FOREIGN PATENT DOCUMENTS

| | | | |
|---|---|---|---|
| WO | WO-2014198567 A1 * | 12/2014 | H04L 63/20 |
| WO | WO 2014198567 A1 | 12/2014 | |

OTHER PUBLICATIONS

Office action for CA2980737, dated Jul. 18, 2018, 3 pages.
Office action for JP2017-549743, dated Nov. 4, 2018, 9 pages.
Office action for CA2980737, dated Jun. 13, 2019, 6 pages.
Office action for JP2017549743, dated Jun. 13, 2019, 9 pages.

* cited by examiner

USING MULTIPLE PROTOCOLS IN A VIRTUAL DESKTOP INFRASTRUCTURE

BACKGROUND

Cloud computing is the use of computing resources (hardware and software) that are available in a remote location and accessible over a network, such as the Internet. In a computing environment with many computing devices, such as a virtual server or cloud computing environment with many server computers, the use of computing resources can provide a number of advantages including cost advantages and/or the ability to adapt rapidly to changing computing resource needs.

To facilitate increased utilization of data center resources, virtualization technologies may allow a single physical computing machine to host one or more virtual desktop instances that appear and operate as independent computer machines to a connected computer user. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis. With the increased use of cloud computing resources, some cloud computing environments running virtual desktop instances may be inefficient in managing resource allocation and providing communication capabilities to accommodate customer-requested functionalities associated with the virtual desktop instances.

BRIEF DESCRIPTION OF THE DRAWINGS

Various embodiments in accordance with the present disclosure will be described with reference to the drawings, in which.

DETAILED DESCRIPTION

Figure 1:
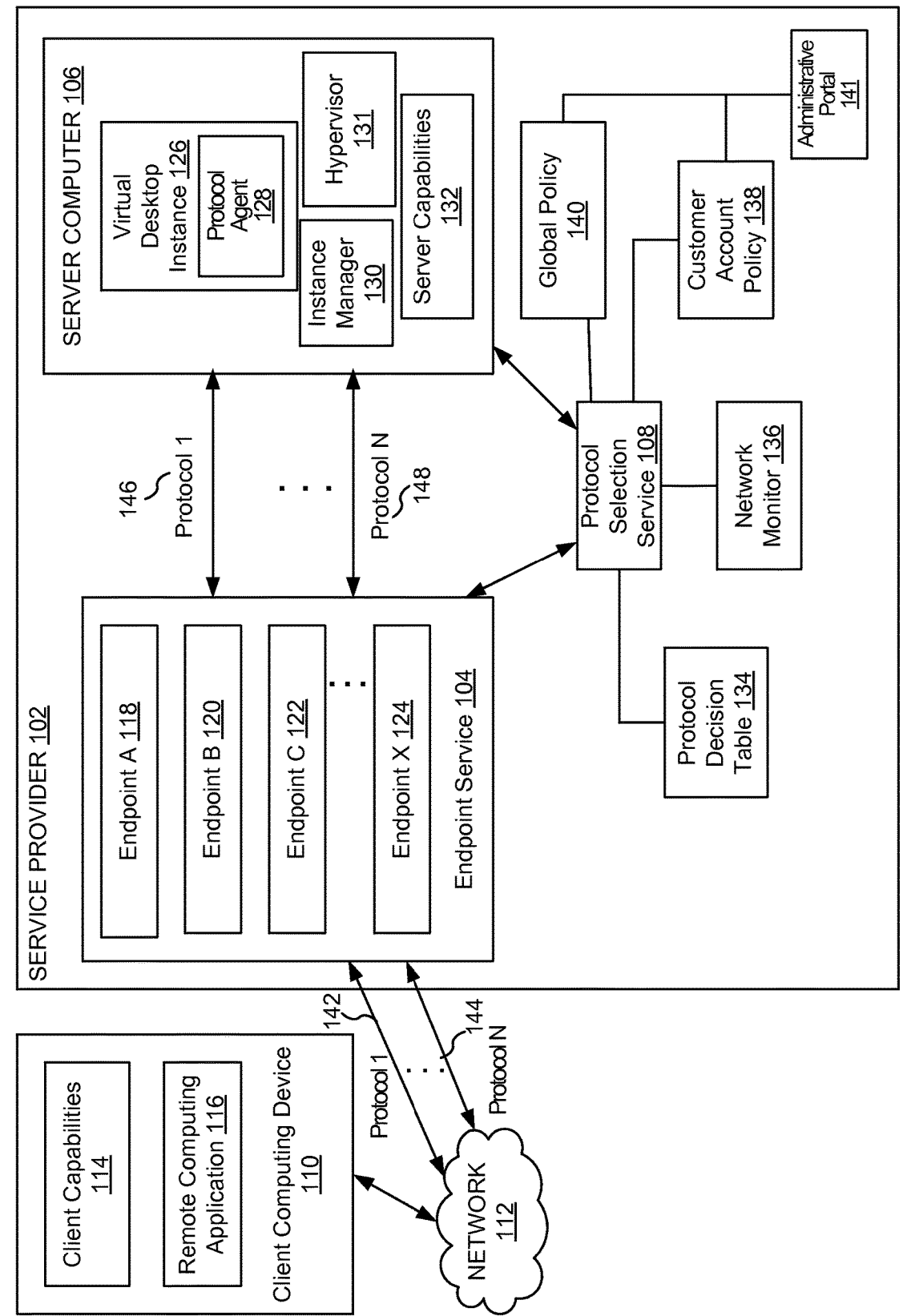
FIG. 1 is a diagram of an example network environment supporting virtual desktop infrastructure in a service provider, in accordance with an embodiment of the disclosure.

A virtual machine image contains an operating system (e.g., Linux) and other data needed to launch a virtual machine in a virtual environment. The virtual machine image is similar to a physical computer's disk volume, and may include a file system, the operating system and other components needed to boot up as a machine. In order to launch a virtual machine, hardware needs to be selected. The hardware selection may be accomplished through instance types, which may allow a variety of different sizes of memory, CPU capacity, I/O performance, and so forth. The combination of the virtual machine image and the instance type can be used to create an "instance" or a virtual machine, which may be launched on a cloud computing resource, such as a host server computer in a multi-tenant network environment. As used herein, the terms "virtual machine" and "virtual machine instance" are interchangeable.

As used herein, the term "virtual desktop infrastructure" refers to an environment with a plurality of server computers, where a desktop operating system can run on a virtual machine instance launched on at least one of the plurality of server computers. The virtual machine instance running a desktop operating system can be referred to as a virtual desktop instance. Although at least some of the embodiments disclosed herein are described in the context of a virtual desktop infrastructure provided by a service provider, further embodiments can be used with an on-premises network, or a with a combination of a service-provider network and an on-premises network.

The following description is directed to techniques and solutions supporting creating a virtual desktop infrastructure environment that can use multiple communication protocols. More specifically, a user of the service provider environment may use a client computing device to access a virtual desktop instance running on a virtual machine. Access to the virtual desktop instance may be provided using a communication channel associated with a first communication protocol. The user may request a functionality (e.g., USB redirection), which may be unsupported by the first communication protocol. A protocol selection service of the service provider may be used to select another (second) communication protocol, which supports the requested functionality. The protocol selection may be performed using a protocol selection table and/or one or more policy documents (e.g., a global policy document and/or a policy document associated with a customer account of the user). The user may be authenticated for using the second communication protocol, and upon authentication, a second communication channel may be established for handling the requested functionality, while the first communication channel is still open. In an example embodiment, one or more network health characteristics for the service provider environment network (e.g., network latency) and/or one or more software and/or hardware characteristics (e.g., CPU, memory, GPU availability, operating system version, and so forth) of the client computing device and the server computer running the virtual desktop instance may be used to determine whether all communications should be switched over to the second communication channel associated with the second communication protocol, or whether communications should be split between the first and second communication channels. In this regard, multiple communication protocols may be used to support access to the virtual desktop instance by the client computing device.

FIG. 1 is a diagram of an example network environment supporting virtual desktop infrastructure in a service provider, in accordance with an embodiment of the disclosure. Referring to FIG. 1, the network environment 100 may include a service provider 102 in communication with a client computing device 110 via the network 112. The service provider 102 may be a multi-tenant cloud network environment where one or more clients (e.g., a user of the client computing device 110) may run one or more virtual machine instances (VMIs) on one or more of server computers (e.g., instance 126 on server computer 106) (even though only a single server computer 106 is illustrated in FIG. 1, multiple server computers can be used by the service provider 102). For example, the virtual machine instance 126 may execute an instance of an operating system and application software to create a virtual desktop instance. Each virtual desktop instance running on one or more server computers can be accessed by one or more client computing devices, such as client computing device 110. The server computers (e.g., 106) may be, for example, client servers operated by (or on behalf of) one or more clients of the service provider 102. The service provider 102 may further comprise an endpoint service 104 with a plurality of endpoints 118, . . . , 124, and a protocol selection service (PSS) 108.

The virtual desktop instance 126 may also include a protocol agent 128. The protocol agent 128 may comprise suitable logic, interfaces, and/or code and may be operable to manage streaming of the virtual desktop instance 126, including setting up new communication ports for new communication links and/or terminate existing communication links and ports. In an example embodiment, the protocol agent 128 may run as an application on the instance 126.

Figure 5:
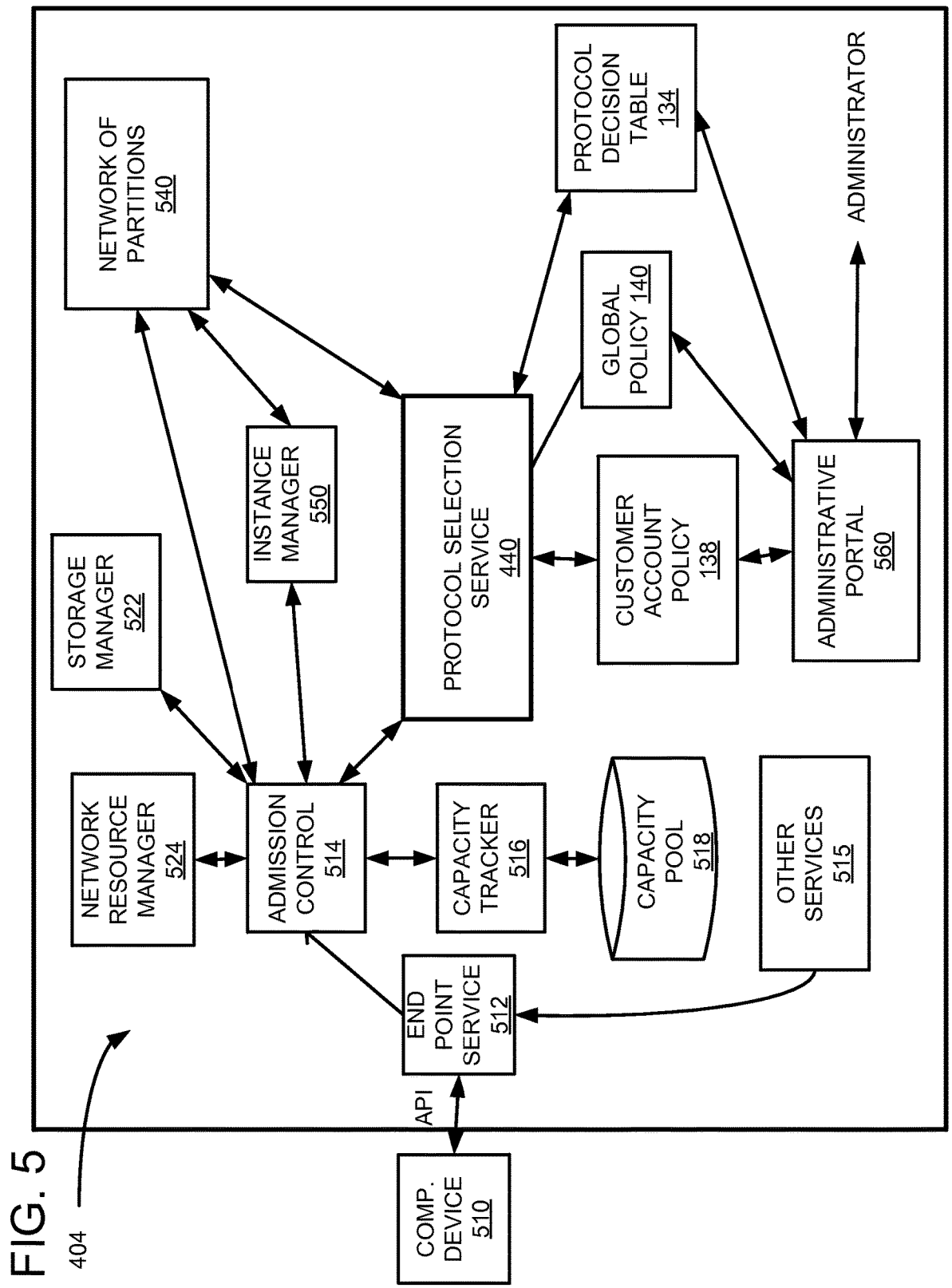
FIG. 5 shows further details of an example system including a plurality of management components associated with a control plane, which may be used to provide protocol selection according to one embodiment.

The server computer 106 may include an instance manager 130. The instance manager 130 may be on the same server computer (e.g., 106) as the virtual desktop instance 126, or on a separate computer. The instance manager 130 may track progress of the instances executed on the server computers (e.g., 106), monitor and coordinate the storage of data created by the user while interacting with the instances (e.g., 126) via the client computing devices, and monitor the overall health and state of the server computers of the service provider 102 and of the remote computing applications (e.g., 116) running on client computing devices (e.g., 110). The instance manager 130 can be part of a management plane (e.g., management server computer), as illustrated in FIG. 5.

The server computer 106 may further include a hypervisor 131 and server capabilities block 132. The hypervisor 131 can be configured to enable the execution of multiple instances (e.g., instance 126) on the server computer 106. The hypervisor is further discussed in reference to FIGS. 4 and 6 below. The server computer 106 may have varied local computing resources such as central processing units and architectures, memory, mass storage, graphics processing units (GPUs), communication network availability and bandwidth, etc. Information on various computing resources of the server computer 106 are designated as server capabilities 132.

The client computing device 110 may be used for providing access to a remote operating system (e.g., virtual desktop instance 126) and applications to a user. In an illustrative embodiment, the client computing device 110 can correspond to a wide variety of computing devices including personal computing devices, laptop computing devices, hand-held computing devices, terminal computing devices, mobile devices (e.g., mobile phones, tablet computing devices, electronic book readers, etc.), wireless devices, various electronic devices and appliances, and the like. In an illustrative embodiment, the client computing device 110 includes necessary hardware and software components for establishing communications over a communication network 112, such as a wide area network or local area network. For example, the client computing device 110 may be equipped with networking equipment and browser software applications that facilitate communications via the Internet or an intranet with one or more of the server computers 106 in the service provider 102. The client computing device 110 may have varied local computing resources such as central processing units and architectures, memory, mass storage, graphics processing units (GPUs), communication network availability and bandwidth, etc. Information on various computing resources of the client computing device 110 are designated as client capabilities 114.

In one embodiment, the client computing device 110 may run a remote computing application 116. The remote computing application 116 may request access to a virtual desktop instance (e.g., 126) hosted by the server computer 106 of the service provider 102. The remote computing application 116 may also manage the remote computing session between the client computing device 110 and the service provider 102. Additionally, the remote computing application 116 may facilitate establishing a connection between one or more communication protocol endpoints (e.g., a communication link using one of a plurality of communication protocols) and a device component (as illustrated in greater detail in FIG. 3).

The endpoint service 104 may include a plurality of endpoints 118, . . . , 124. Each of the endpoints 118, . . . , 124 may comprise suitable logic, circuitry, interfaces, and/or code and may be operable to provide authentication of one or more service provider clients (e.g., user of the client device 110) and facilitate communication between the client computing device 110 and the server computers (e.g., 106). Each of the endpoints 118, . . . , 124 may comprise a secure gateway, router, or another network device operable to use one or more communication links associated with at least one of a plurality of communication protocols (e.g., communication links 146, . . . , 148 and 142, . . . , 144 associated with communication protocols 1, N). Additionally, each of the endpoints within the endpoint service 104 may be a cloud endpoint located in one of a plurality of separate regions (e.g., separate geographic regions) associated with the service provider 102. An example communication sequence for establishing a secure link between the client computing device 110, the endpoint service 104 and the server computer 106 is described herein below in reference to FIG. 2.

The protocol selection service (PSS) 108 may comprise suitable logic, circuitry, interfaces, and/or code and may be operable to select a communication protocol and facilitate establishing of a communication link (or channel) associated with the communication protocol between the client computing device 110 and the server computer 106. The PSS 108 may also use a policy document (e.g., 138 and/or 140), which may specify one or more policies in connection with protocol selection functionalities. For example, the customer account policy 138 may specify one or more communication protocols that a customer (e.g., user of the computing device 110) is authorized to use for a specific functionality associated with accessing the virtual desktop instance 126.

Example functionalities which may be requested by a user of client device 110 in connection with access to the virtual desktop instance 126 may include a multimedia data processing functionality, a USB data processing functionality (e.g., USB redirection), a virtual channel data processing functionality, and a keyboard data processing functionality. Example communication protocols which may be used in connection with requested functionalities may include PC-over-IP (PCoIP) communication protocol and Remote Desktop Protocol (RDP).

The global policy 140 may specify protocol selection policies that can be used in connection with all users of the service provider environment 102. The policy documents 138 and 140 may be updated by, for example, an administrator via the administrative portal 141. The PSS 108 may further use a network monitor 136 and a protocol decision table 134 during selection of a communication protocol as well as to determine whether to simultaneously maintain open two or more communication links (e.g., each associated with a different communication protocol) or whether to switch over all communication traffic between the computing device 110, the endpoint service 104 and the server computer 102 using a single communication link. For example, the PSS 108 may receive information about the client capabilities 114, the server capabilities 132 and information from the network monitor 136, and use the received information to determine whether to switch communications from an existing communication link based on one communication protocol to a new communication link based on another communication protocol. The information supplied from the network monitor may include health information about the communication network within the service provider 102, such as network latency, bandwidth, and so forth.

In accordance with an example embodiment of the disclosure, the PSS 108 may be implemented as a stand-alone service within the service provider 102 (as illustrated in FIG. 1) or it may be implemented as a code library (i.e., software) within one or more of the server computers (e.g., 106).

Figure 2:
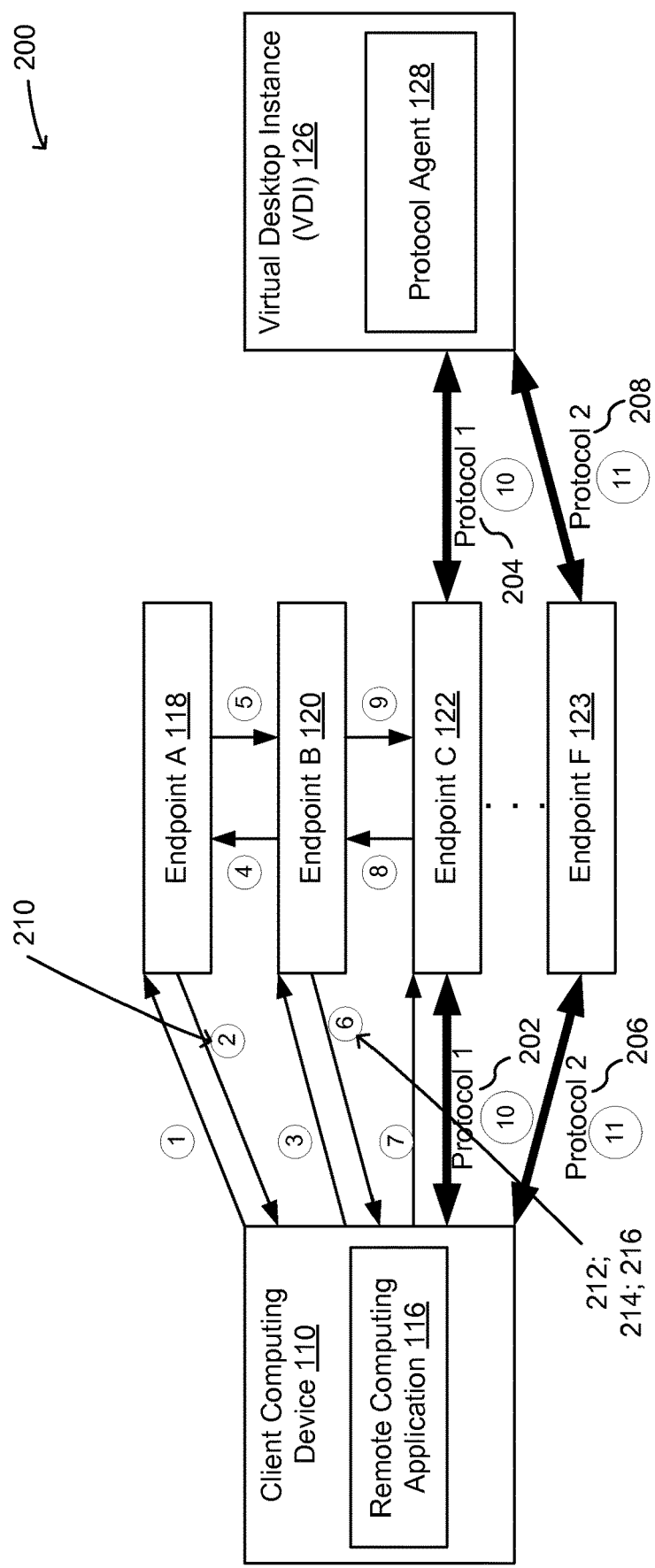
FIG. 2 is a block diagram of an example client computing device authentication for accessing a virtual desktop instance using one or more communication protocols, in accordance with an embodiment of the disclosure.

FIG. 2 is a block diagram of an example client computing device authentication for accessing a virtual desktop instance using one or more communication protocols, in accordance with an embodiment of the disclosure. Referring to FIGS. 1-2, a user of device 110 may be a client of the service provider 102 and may use server computer 106 to run a virtual desktop instance 126 (e.g., the user may obtain a customer account from the service provider 102 in exchange for a fee, giving the user the right to launch a virtual desktop on one or more instances running on one or more server computers such as server computer 106). In other words, the virtual desktop instance 126 may be associated with a customer account of the user of device 110. The user may have more than one virtual desktop instances at a time, however, may be able to login and use one virtual desktop instance at a time.

In an example communication exchange for obtaining access to the virtual desktop instance 126, the user of the client computing device 110 may initiate communication with the endpoint service 104 by sending (at ref #1) a login ID (user name) and password (or any other login/authentication credentials associated with a customer account) to the endpoint 118. The endpoint 118 may authenticate the user and may send back (at ref #2) an authentication token 210 to the client computing device 110. The client device 110 may then send the authentication token 210 (at ref #3) to the endpoint 120. The endpoint 120 may forward the token (at ref #4) to endpoint 118 to confirm the token belongs to the requesting user and the user has a valid customer account. A confirmation the user is authenticated may be sent (at ref #5) from endpoint 118 to endpoint 120. Endpoint 120 may then return (at ref #6) virtual desktop instance identification 212 (which may include a port number, such as a port used to establish communication link 204 using protocol 1), a gateway IP address 214, and a secure token 216. The gateway IP address 214 may be an IP address for endpoint 122, which can operate as a proxy between the client computing device 110 and the virtual desktop instance 126 while using communication links 202 and 204. The secure token 216 may be used for authenticating the client device 110 to use the endpoint 122 as a proxy to communicate with the virtual desktop instance 126 using at least one of a plurality of available communication protocols (e.g., protocol 1).

The virtual desktop instance identification 212, the gateway IP address 214, and the secure token 216 may be communicated to endpoint 122 (at ref #7). The endpoint 122 may communicate the secure token 216 (at ref #8) to endpoint 120, which has issued the token. Endpoint 120 may authenticate the token 216 and may provide a confirmation of the authentication back to endpoint 122 (at ref #9). The protocol selection service 108 may then communicate with the protocol agent 128 at the virtual desktop instance 126 (e.g., using virtual desktop instance identification 212) and have the protocol agent 128 open a new port for establishing a communication link 204 using communication protocol 1. The communication protocol 1 may be selected by the protocol selection service using a protocol decision table 134. More specifically, the protocol decision table 134 may associate one or more device functionalities (e.g., functionalities requested or necessary for the device 110 to access the instance 126) with one or more communication protocols selected from a plurality of available communication protocols.

In an example embodiment, the PSS 108 may select the communication protocol for communication links 202 and 204 using a global policy document and/or a customer account policy 138. The policy documents 138/140 may specify which communication protocol to use for a specific functionality required by computing device 110 to access the virtual desktop instance 126. The PSS 108 may also authenticate the user of client device 110 to use a given communication protocol, prior to establishing a link using such protocol. The user authentication may be performed using, for example, the customer account policy 138, which may specify which protocols the client/user is authorized to use within the service provider environment.

After the protocol agent 128 opens a new port, communication links 202 and 204 may be established (or links 142, 146 in FIG. 1) using communication protocol 1 for providing the client device 110 access to the virtual desktop instance 126. In another example embodiment, the PSS 108 may detect a new functionality requested by the client device 110, where the new functionality is unsupported by the communication protocol 1 associated with communication channels/links 202/204. For example, the user of device 110 may use an USB memory stick in connection with accessing instance 126, however, USB redirection may be unsupported by communication protocol 1. The communication sequence indicated by reference numbers 1-6 may take place again, however, endpoint 120 may return gateway IP address 214 identifying endpoint 123, and a secure token 216 authorizing the user and client device 110 to access endpoint 123 as a proxy between device 110 and virtual desktop instance 126 using communication links 206/208 associated with communication protocol 2.

The PSS 108 may select communication protocol 2 so that it supports the requested functionality, which is unsupported by protocol 1. The selection of protocol 2 may be based on the protocol decision table 134, the global policy 140, and/or the customer account policy 138. As an alternative, the new protocol 2 may also be selected by the user and communicated to the PSS 108 via the endpoint 123. Similarly to communication link 204, the protocol agent 128 may establish a new port associated with protocol 2, so that the PSS 108 (or the protocol agent 128) may open new communication links 206/208 (or 144/148 in FIG. 1) associated with communication protocol 2. In this regard, the client computing device 110 may access the virtual desktop instance 126 concurrently using at least two different communication protocols (i.e., communication links 202, . . . , 208 are open and used simultaneously).

In yet another example embodiment, the PSS 108 may use the client capabilities 114, the server capabilities 132 and/or information from the network monitor 136 (e.g., network latency information) to determine whether to offload (or switch over) communication traffic from one communication link of a first protocol type (e.g., links 202/204 using protocol 1) to another communication link of a second protocol type (e.g., links 206/208 using protocol 2). Such communication distribution functionality may be performed automatically or upon network administrator approval (e.g., via the portal 141). Additionally, any time a new communication protocol is used (e.g., a new communication link is established to handle certain functionality) or communication traffic is switched (fully or partially) from one protocol to another, a notification may be displayed at the client computing device 110.

Figure 3:
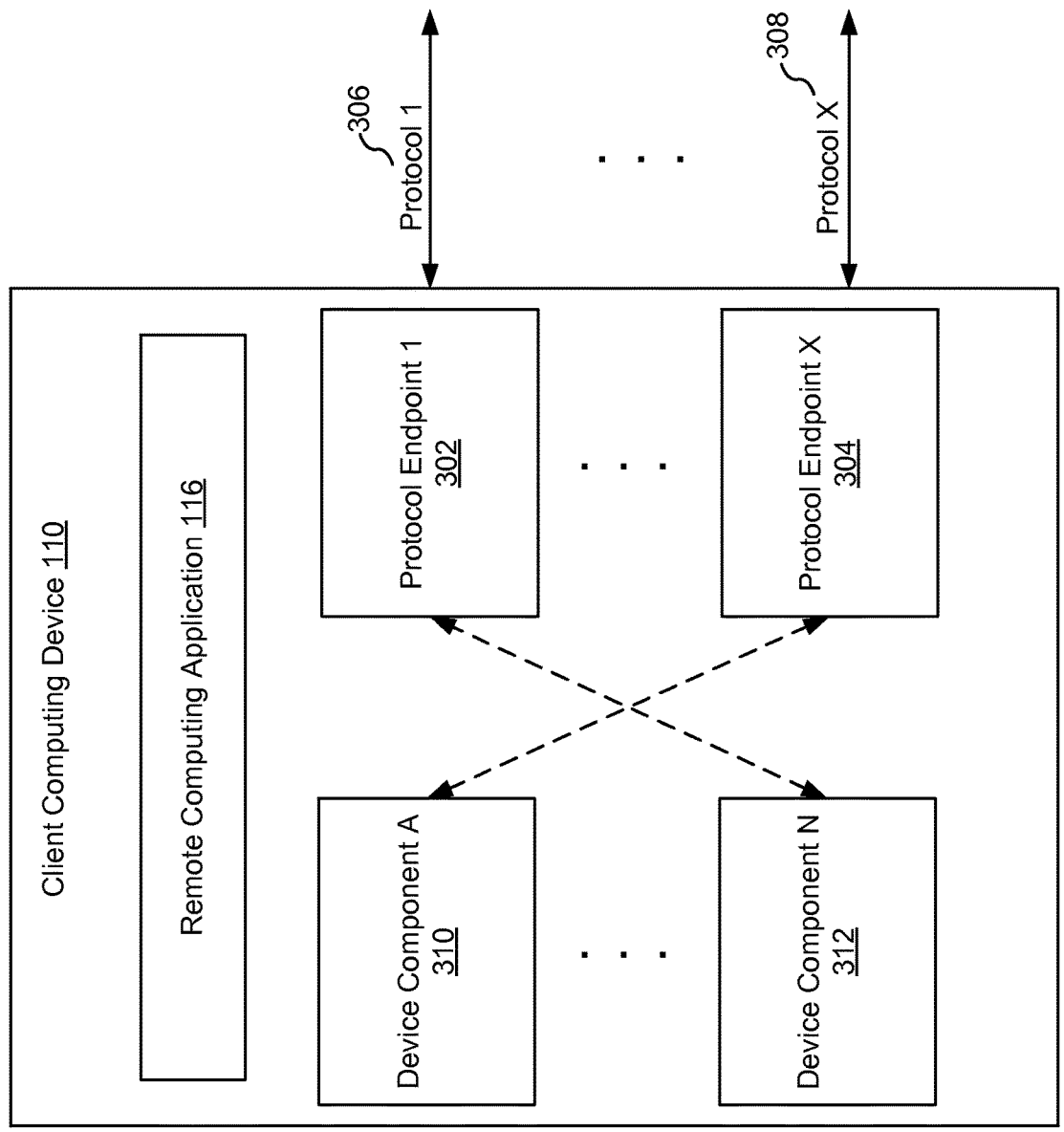
FIG. 3 is a block diagram of an example client computing device running a remote computing application that can associate a plurality of communication protocols with a plurality of device components, in accordance with an embodiment of the disclosure.

FIG. 3 is a block diagram of an example client computing device running a remote computing application that can associate a plurality of communication protocols with a plurality of device components, in accordance with an embodiment of the disclosure. Referring to FIG. 3, there is illustrated the client computing device 110 using multiple communication links 306, . . . , 308 using different communication protocols 1, . . . , X. Each communication link 306, . . . , 308 may be used to handle a specific type of functionality or communication used by the client device 110 to access a virtual desktop instance. Additionally, communication links 306, . . . , 308 may enter the client computing device 110 at corresponding protocol endpoints 302, . . . , 304. In accordance with an example embodiment of the disclosure, the remote computing application 116 may determine one or more device components associated with a given protocol and then direct communication traffic from such protocol to the one or more components. For example, if communication link 306 uses RDP protocol to handle USB redirection, then the remote computing application 116 may associate protocol endpoint 302 with device component 312 (e.g., a USB port and associated components providing USB access functionality).

Figure 4:
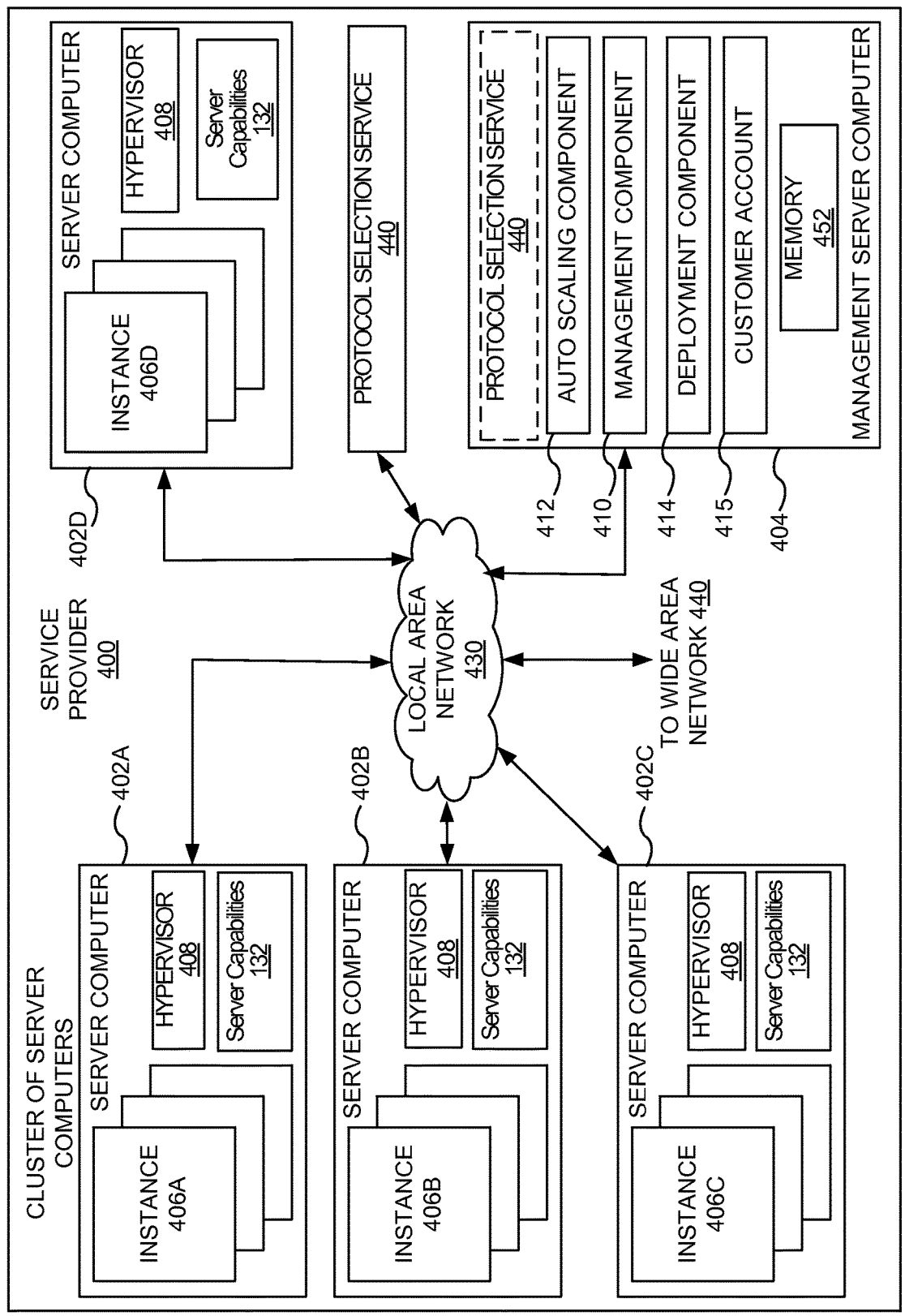
FIG. 4 is an example system diagram showing a plurality of virtual machine instances running in a multi-tenant environment, using a protocol selection service, in accordance with an example embodiment of the disclosure.

FIG. 4 is an example system diagram showing a plurality of virtual machine instances running in a multi-tenant environment, using a protocol selection service, in accordance with an example embodiment of the disclosure. More specifically, FIG. 4 is a computing system diagram of a network-based service provider 400 that illustrates one environment in which embodiments described herein can be used. By way of background, the service provider 400 (i.e., the cloud provider) is capable of delivery of computing and storage capacity as a service to a community of end recipients (e.g., tenants or customers). The service provider 400 may be the same as the service provider 102 illustrated in FIGS. 1-3.

In an example embodiment, the service provider 400 can be established for an organization by or on behalf of the organization. That is, the service provider 400 may offer a "private cloud environment." In another embodiment, the service provider 400 supports a multi-tenant environment, wherein a plurality of customers operate independently (i.e., a public cloud environment). Generally speaking, the service provider 400 can provide the following models: Infrastructure as a Service ("IaaS"), Platform as a Service ("PaaS"), and/or Software as a Service ("SaaS"). Other models can be provided. For the IaaS model, the service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the service provider platform without the cost of buying and managing the underlying hardware and software. The SaaS model allows installation and operation of application software in the service provider. In some embodiments, end users access the service provider 400 using networked customer devices, such as desktop computers, laptops, tablets, smartphones, etc. running web browsers or other lightweight customer applications. Those skilled in the art will recognize that the service provider 400 can be described as a "cloud" environment.

The particular illustrated service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e., a computer) that executes applications like a physical machine. In the example, each of the server computers 402A-402D can be configured to execute a hypervisor 408 or another type of program configured to enable the execution of multiple instances 406 on a single server. For example, each of the servers 402A-402D can be configured (e.g., via the hypervisor 408) to support one or more virtual machine partitions, with each virtual machine partition capable of running a virtual machine instance (e.g., server computer 402A could be configured to support three virtual machine partitions each running a corresponding virtual machine instance). Additionally, each of the instances 406 can be configured to execute one or more applications.

The service provider 400 may also comprise a protocol selection service 440, which may have the functionalities described herein in connection with the PSS 108. The protocol selection service 440 may be implemented as a stand-alone service within the provider 400, as a dedicated server (similar to the servers 402A-402D), as a code library within one or more of the servers 402, and/or may be implemented as part of the server computer 404 that performs management functions. For example, the protocol selection service 440 may be implemented as part of the management component 410 (as seen in FIG. 5).

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402, the instances 406, the hypervisors 408, and/or the protocol selection service 440. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand.

The server computer 404 may further comprise memory 452, which may be used as processing memory by the protocol selection service 440. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager (e.g., 550 in FIG. 5) can be considered part of the deployment component 414.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, and so forth.

A network 430 can be utilized to interconnect the server computers 402A-402D and the server computer 404. The network 430 can be a local area network (LAN) and can be connected to a Wide Area Network (WAN) 440 so that end-users can access the service provider 400. It should be appreciated that the network topology illustrated in FIG. 4 has been simplified and that many more networks and networking devices can be utilized to interconnect the various computing systems disclosed herein.

FIG. 5 shows further details of an example system including a plurality of management components associated with a control plane, which may be used to provide protocol selection according to one embodiment. More specifically, FIG. 5 illustrates in further detail the management component 410, which may implement the protocol selection service 440 within the multi-tenant environment of the service provider 400.

In order to access and utilize instances (such as instances 406 of FIG. 4), a customer device can be used. The customer device 510 can be any of a variety of computing devices, mobile or otherwise, including a cell phone, smartphone, handheld computer, Personal Digital Assistant (PDA), desktop computer, etc. The customer device 510 can communicate with the service provider 400 through an end point 512, which can be a DNS address designed to receive and process application programming interface (API) requests. In particular, the end point 512 can be a web server configured to expose an API. Using the API requests, a customer device 510 can make requests to implement any of the functionality described herein or to access one or more services provided by the service provider 400. Other services 515, which can be internal to the service provider 400, can likewise make API requests to the end point 512. The API requests from the client can pass through the admission control 514 and onto the protocol selection service 440 in order to access protocol selection-related functionalities of the service provider 400.

Other general management services that may or may not be included in the service provider 400 (and/or within the management component 410) include an admission control 514, e.g., one or more computers operating together as an admission control web service. The admission control 514 can authenticate, validate and unpack the API requests for service or storage of data within the service provider 400. The capacity tracker 516 is responsible for determining how the servers need to be configured in order to meet the need for the different instance types by managing and configuring physical inventory in terms of forecasting, provisioning, and real-time configuration and allocation of capacity. The capacity tracker 516 maintains a pool of available inventory in a capacity pool database 518. The capacity tracker 516 can also monitor capacity levels so as to know whether resources are readily available or limited.

An instance manager 550 controls launching and termination of virtual machine instances in the network. When an instruction is received (such as through an API request) to launch an instance, the instance manager 550 pulls resources from the capacity pool 518 and launches the instance on a decided upon host server computer. Similar to the instance manager are the storage manager 522 and the network resource manager 524. The storage manager 522 relates to initiation and termination of storage volumes, while the network resource manager 524 relates to initiation and termination of routers, switches, subnets, etc. A network of partitions 540 is described further in relation to FIG. 6, and includes a physical layer upon which the instances are launched.

The protocol selection service 440 may perform the protocol selection functionalities described herein (e.g., the functionalities described in reference to the PSS 108). The PSS 440 may communicate with the admission control 514

(e.g., to receive new functionality requests and requests for establishing new communication links or switch communication from one protocol type to another), with the network of partitions 540 (e.g., to access a virtual desktop instance running on a server computer), the policy documents 138/140, and the protocol decision table 134 (e.g., as described in connection with FIG. 1).

Figure 6:
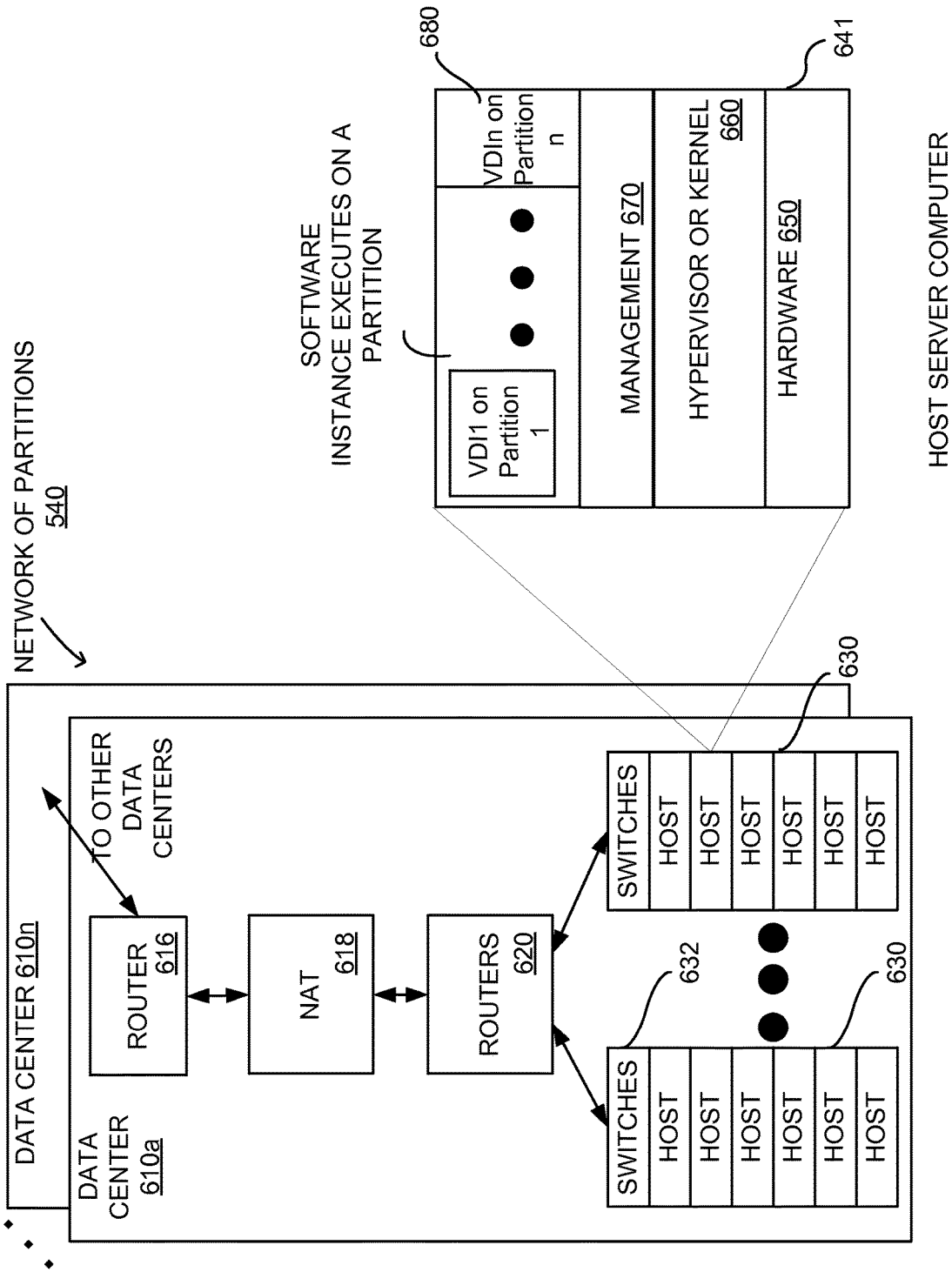
FIG. 6 shows an example of a plurality of host computers, routers, and switches—which are hardware assets used for running virtual machine instances—with the host computers having protocol selection-related functionalities that may be configured according to one embodiment.

FIG. 6 shows an example of a plurality of host computers, routers, and switches—which are hardware assets used for running virtual machine instances—with the host computers having protocol selection-related functionalities that may be configured according to one embodiment. More specifically, FIG. 6 illustrates the network of partitions 640 and the physical hardware associated therewith. The network of partitions 640 can include a plurality of data centers, such as data centers 610a, . . . , 610n, coupled together by routers, such as router 616.

The router 616 reads address information in a received packet and determines the packet's destination. If the router decides that a different data center contains a host server computer, then the packet is forwarded to that data center. If the packet is addressed to a host in the data center 610a, then it is passed to a network address translator (NAT) 618 that converts the packet's public IP address to a private IP address. The NAT 618 also translates private addresses to public addresses that are bound outside of the data center 610a. Additional routers 620 can be coupled to the NAT 618 to route packets to one or more racks 630 of host server computers. Each rack 630 can include a switch 632 coupled to multiple host server computers. A particular host server computer is shown in an expanded view at 641.

Each host 641 has underlying hardware 650. Running a layer above the hardware 650 is a hypervisor or kernel layer 660. The hypervisor or kernel layer 660 can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can also be used. In an example embodiment, the hypervisor layer 660 may include the DFS software 409, which may be used to install DSNs or DMNs, as described herein.

A management layer 670 can be part of the hypervisor or separated therefrom, and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system (e.g., VMI1 may be running on partition 1 and VMIn may be running on partition n). As such, each partition 680 is an abstract portion of capacity designed to support its own virtual machine independent of the other partitions. One or more of the VMIs (VMI1, VMIn) on partitions 680 may also execute virtual desktop instances (VDIs) associated with a customer account, similar to the VDI 126 in FIG. 1.

Figure 7:
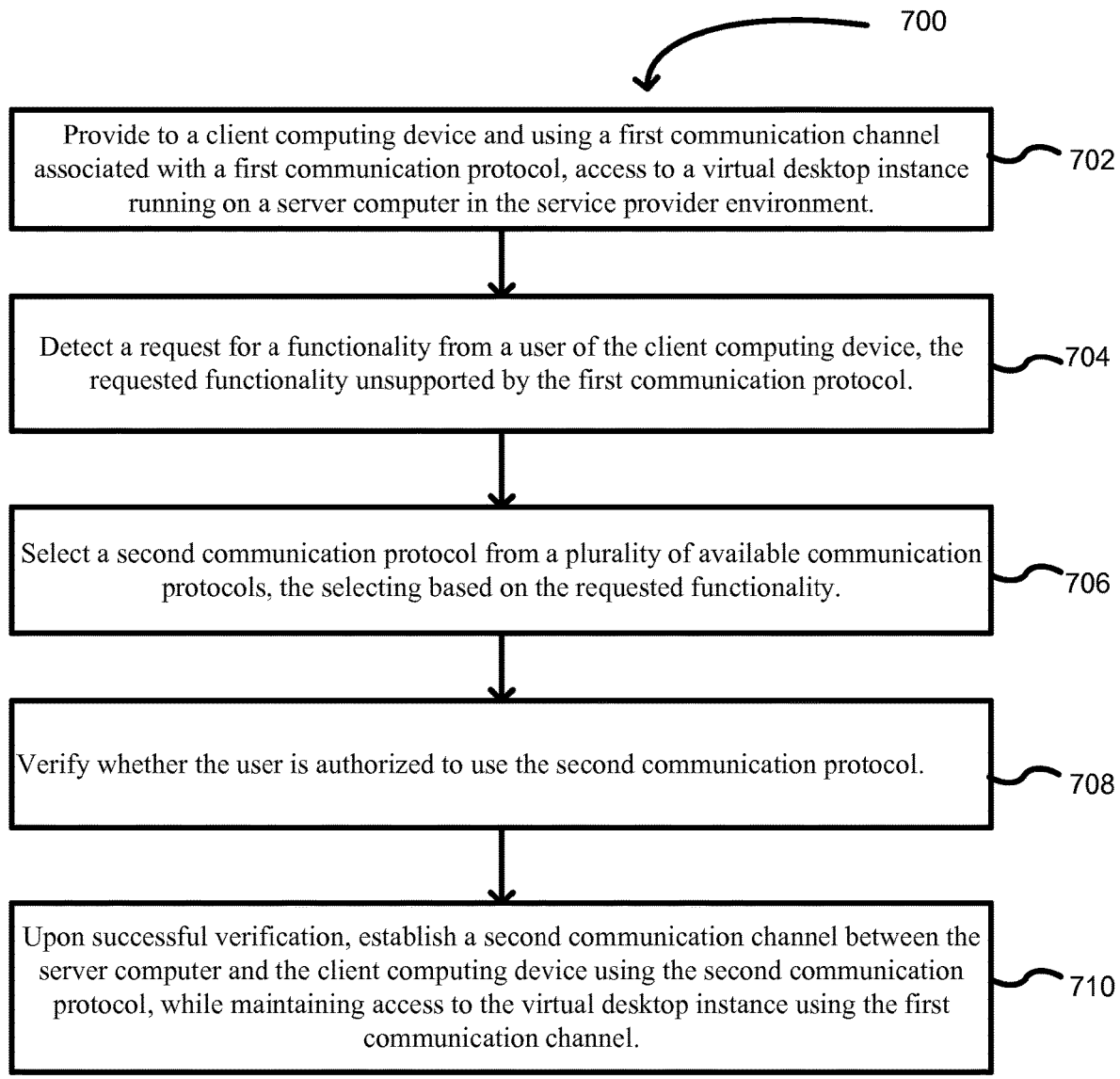
FIGS. 7-8 are flowcharts of example methods of selecting a communication protocol for a virtual desktop instance in a service provider environment, in accordance with an embodiment of the disclosure.
Figure 8:
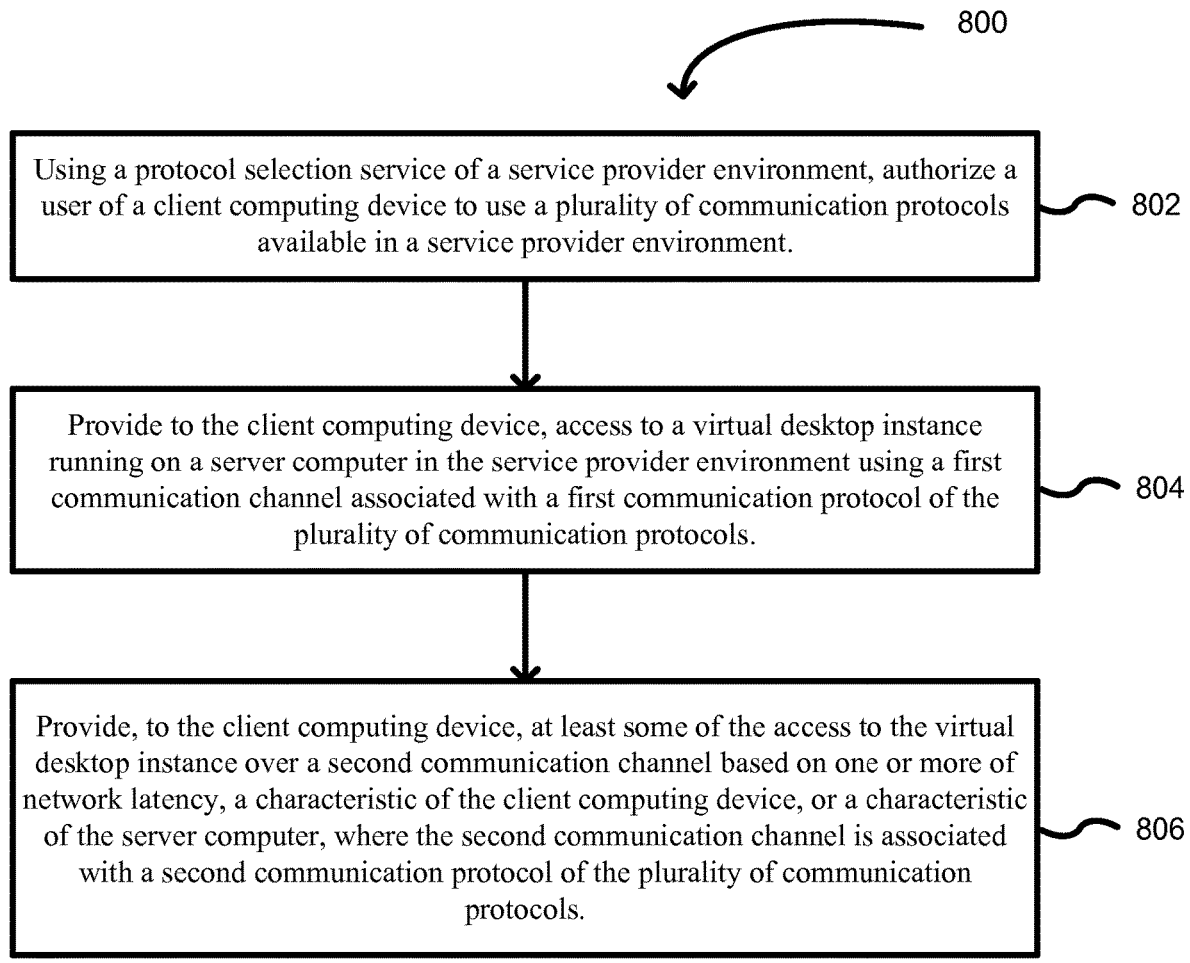

FIGS. 7-8 are flowcharts of example methods of selecting a communication protocol for a virtual desktop instance in a service provider environment, in accordance with an embodiment of the disclosure. Referring to FIGS. 1-2 and 7, the example method 700 may start at 702, when the protocol selection service 108 may provide to a client computing device (e.g., 110), access to a virtual desktop instance (e.g., 126) running on a server computer (e.g., 106) in a service provider environment using a first communication channel associated with a first communication protocol. For example, the endpoint service 104 and the client device 110 may perform the secure authentication sequence as described in reference to FIG. 2, the PSS 108 may authenticate the device 110 for use of communication protocol 1, and then establish communication links 202/204 based on the communication protocol 1 for accessing the virtual desktop instance 126.

At 704, the PSS 108 may detect a request for a functionality from a user of the client computing device 110, where the requested functionality is unsupported by the first communication protocol (i.e., protocol 1 associated with the existing communication links 202/204). For example, the requested functionality may be one of a multimedia data processing functionality, a USB data processing functionality, a virtual channel data processing functionality, and/or a keyboard data processing functionality. At 706, the PSS 108 may select based on the requested functionality, a second communication protocol from a plurality of available communication protocols, the second communication protocol supporting the requested functionality. The PSS 108 may select communication protocol 2 so that it supports the requested functionality, which is unsupported by protocol 1. The selection of protocol 2 may be based on the protocol decision table 134, the global policy 140, and/or the customer account policy 138. For example, at 708, the PSS 108 may verify whether the user is authorized to use the second communication protocol (e.g., protocol 2) by consulting the customer account policy 138 and/or the global policy 140.

At 710, upon successful verification, the PSS 108 may establish a second communication channel (e.g., 206/208) between the server computer and the client computing device using the second communication protocol (e.g., protocol 2), while maintaining access to the virtual desktop instance 126 using the first communication channel (e.g., 202/204). Similarly to communication link 204, the protocol agent 128 may establish a new port associated with protocol 2, so that the PSS 108 (or the protocol agent 128) may open new communication links 206/208 (or 144/148 in FIG. 1) associated with communication protocol 2.

Referring to FIGS. 1-2 and 8, the example method 800 may start at 802, when the PSS 108 may authorize a user of a client computing device (110) to use a plurality of communication protocols available in a service provider environment. For example, the PSS 108 may authorize the user of the computing device 110 to use one or more of the available protocols 1, . . . , N for establishing various communication links based on such protocols. At 804, the PSS 108 may provide to the client computing device 110, access to a virtual desktop instance (e.g., 126) running on a server computer in the service provider environment using a first communication channel associated with a first communication protocol of the plurality of communication protocols. For example, the PSS may establish communication links 202/204 using communication protocol 1, after the user of device 110 has been authenticated (e.g., based on the secure exchange described in reference to FIG. 2 and reference numbers 1-11).

At 806, the PSS 108 may provide to the client computing device 110, at least some of the access to the virtual desktop instance 126 over a second communication channel (e.g., 206/208) based on one or more of network latency (e.g., as measured by the network monitor 136), a characteristic of the client computing device (e.g., 114), or a characteristic of the server computer (e.g., 132), where the second communication channel is associated with a second communication protocol of the plurality of communication protocols. For example, the PSS 108 may use the client capabilities 114, the server capabilities 132 and/or information from the network monitor 136 (e.g., network latency information) to determine whether to offload (or switch over) communication traffic from one communication link of a first protocol type (e.g., links 202/204 using protocol 1) to another communication link of a second protocol type (e.g., links 206/208 using protocol 2). Such communication distribution functionality may be performed automatically or upon network administrator approval (e.g., via the portal 141).

Figure 9:
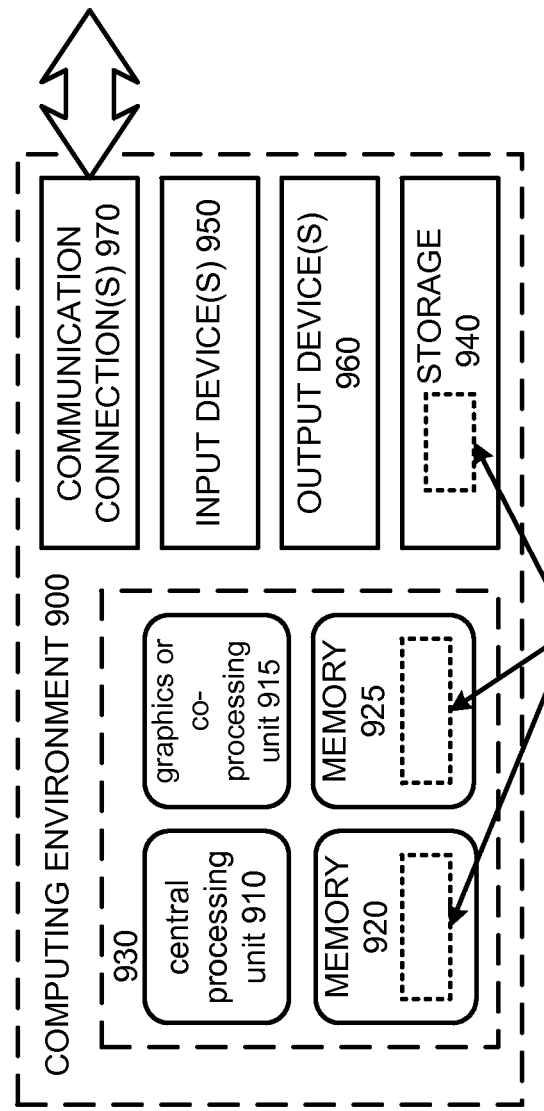
FIG. 9 depicts a generalized example of a suitable computing environment in which the described innovations may be implemented.

FIG. 9 depicts a generalized example of a suitable computing environment in which the described innovations may be implemented. Referring to FIG. 9, the computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations (e.g., functionalities) described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a customer-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method for selecting a communication protocol for a virtual desktop instance in a service provider environment, the method comprising:
   providing, to a client computing device and using a first communication channel associated with a first communication protocol, access to a virtual desktop instance running on a server computer in the service provider environment;
   detecting a request for a functionality from a user of the client computing device, wherein the requested functionality is unsupported by the first communication protocol such that the first communication protocol cannot be used for the requested functionality;
   selecting, based on the requested functionality, a second communication protocol from a plurality of available communication protocols, the second communication protocol supporting the requested functionality, wherein the selecting is accomplished using a protocol selection service executing on a separate server computer from the virtual desktop instance and from an endpoint service through which the first communication channel is established, wherein the protocol selection service ensures that a global policy document and a customer policy document are enforced, wherein the global policy document specifies protocol selection policies used in connection with all customers and the customer policy document specifies protocol selection policies for a specific customer;
   verifying whether the user is authorized to use the second communication protocol through a check that the second communication protocol is authorized for use by the user in accordance with the customer policy document and the global policy document;
   upon successful verification, establishing a second communication channel between the server computer and the client computing device using the second communication protocol, while maintaining access to the virtual desktop instance using the first communication channel, wherein first and second endpoints, within the service provider environment, and a server computer, within the service provider environment, communicate with each other using each of the first communication protocol and the second communication protocol; and
   switching over a functionality from the first communication protocol to the second communication protocol based on a determination of at least one of a performance characteristic of the client device, a performance characteristic of the server computer, or network latency information.

2. The method according to claim 1, further comprising:
   receiving information indicative of:
      at least one characteristic of the client computing device and the server computer; and
      network latency associated with the service provider environment.

3. The method according to claim 2, further comprising:
   determining whether to close the first communication channel and provide access to the virtual desktop instance using the second communication channel based on one or more of:
      the network latency;
      the at least one characteristic of the client computing device; or
      the at least one characteristic of the server computer.

4. The method according to claim 1, wherein the plurality of available communication protocols are listed in a protocol decision table within the service provider environment, each of the plurality of available communication protocols associated with one or more functionalities performed by the client computing device.

5. The method according to claim 1, wherein the requested functionality is at least one of:
   a multimedia data processing functionality;
   a USB data processing functionality;
   a virtual channel data processing functionality; or
   a keyboard data processing functionality.

6. A non-transitory computer-readable storage medium including instructions that, upon execution, cause a computer system to:
   provide, to a client computing device and using a first communication channel associated with a first communication protocol of a plurality of communication protocols, access to a virtual desktop instance running on a server computer in a service provider environment;
   detect a request from a user for a functionality, wherein the requested functionality is not supported by the first communication protocol such that the first communication protocol cannot be used for the requested functionality; and
   determine that a second communication protocol amongst the plurality of communication protocols supports the requested functionality, wherein the determining is accomplished using a protocol selection service executing on a separate server computer from the virtual desktop instance and from an endpoint service through which the first communication channel is established, wherein the protocol selection service ensures that a global policy document and a customer policy document are enforced, wherein the global policy document specifies protocol selection policies used in connection with all customers and the customer policy document specifies protocol selection policies for a specific customer;

verify that the user is authorized to use the second communication protocol through a check that the second communication protocol is authorized for use by the user in accordance with the customer policy document and the global policy document;

provide, to the client computing device, at least some of the access to the virtual desktop instance over a second communication channel using the second communication protocol that supports the functionality in the request, wherein multiple endpoints, within the service provider environment, and a server computer, within the service provider environment, communicate with each other using each of the first communication protocol and the second communication protocol;

wherein the functionality communicated between the server computer and the client computing device via the first protocol is converted to the second protocol based on one or more of network latency, a characteristic of the client computing device, or a characteristic of the server computer.

7. The computer-readable storage medium according to claim 6, wherein the instructions, upon execution, further cause the computer system to:

close the first communication channel and provide the access to the virtual desktop instance to the second communication channel associated with the second communication protocol.

8. The computer-readable storage medium according to claim 6, wherein the requested functionality is at least one of:

a multimedia data processing functionality;
a USB data processing functionality;
a virtual channel data processing functionality; or
a keyboard data processing functionality.

9. The computer-readable storage medium according to claim 6, wherein the instructions, upon execution, further cause the computer system to simultaneously use the first and second communication protocols to provide the access to the virtual desktop instance.

10. The computer-readable storage medium according to claim 6, wherein the plurality of communication protocols comprise at least one of:

PC-over-IP (PCoIP) communication protocol; or
Remote Desktop Protocol (RDP).

11. The computer-readable storage medium according to claim 6, wherein the at least one characteristic of the client computing device or the at least one characteristic of the server computer comprise at least one of:

at least one CPU characteristic;
availability of an encryption or decryption device;
memory capacity; or
availability of a graphics processing unit (GPU).

12. The computer-readable storage medium according to claim 6, wherein the instructions, upon execution, further cause the computer system to:

verify the requested functionality is supported by the second communication protocol; and
upon successful verification, provide the requested functionality to the client computing device using the second communication channel.

13. The computer-readable storage medium according to claim 6, wherein the instructions, upon execution, further cause the computer system to:

determine whether the requested functionality is supported by the second communication protocol; and
upon determining the requested functionality is unsupported by the second communication protocol;
select, based on the requested functionality, a third communication protocol from the plurality of communication protocols, the third communication protocol supporting the requested functionality; and
establish a third communication channel between the server computer and the client computing device using the third communication protocol for performing the requested functionality, while maintaining access to the virtual desktop instance using the first and second communication channels.

14. A system, comprising:

a plurality of server computers coupled together through a network to form a service provider environment, at least a portion of the server computers for executing virtual desktop instances; and a protocol selection service communicatively coupled to the plurality of server computers and to a client computing device, the protocol selection service operable to:

provide to the client computing device a first functionality for one of the virtual, desktop instances, the first functionality being provided using a first communication protocol; and provide to the client device a second functionality for the one of the virtual desktop instances, the second functionality being provided using a second communication protocol and being provided simultaneously with the first functionality, the first and second communication protocols being different protocols, wherein the second communication protocol is provided based upon a rawest from a user for the second functionality, which is not supported by the first protocol such that the first communication protocol cannot be used for the second functionality, and the second communication protocol is provided by using a protocol selection service executing on a separate server computer from the virtual desktop instance and from an endpoint, service through which the first communication channel is establish, wherein the protocol selection service ensures that a global policy document and a customer policy document are enforced, wherein the global policy document specifies protocol selection policies used in connection with all customers and the customer policy document specifies protocol selection policies for a specific customer, wherein an endpoint, within the service provider environment, and a server computer, within the service provider environment, communicate with each other using each of the first communication protocol and the second communication protocol;

wherein the first functionality is switched from the first protocol to the second protocol based on one or more of network latency, a characteristic of the client computing device or a characteristic of the server computer, wherein the second protocol is verified to be authorized for use by the user m accordance with the global policy document and the customer account policy document.

15. The system according to claim 14, wherein the protocol selection service is further operable to:

receive information indicative of at least one characteristic of the client computing device, at least one characteristic of one or more of the plurality of server computers, or network latency associated with the service provider environment.

16. The system according to claim 15, wherein the protocol selection service is further operable to determine whether to stop using the first communication protocol based on the received information.

\* \* \* \* \*

UNITED STATES PATENT AND TRADEMARK OFFICE
CERTIFICATE OF CORRECTION

PATENT NO. : 10,911,574 B2
APPLICATION NO. : 14/668543
DATED : February 2, 2021
INVENTOR(S) : Pessis et al.

It is certified that error appears in the above-identified patent and that said Letters Patent is hereby corrected as shown below:

In the Claims

Column 18,
Line 35, "upon a rawest" should be --upon a request--.
Line 43, "is establish," should be --is established--.

Signed and Sealed this
Fourteenth Day of February, 2023

Katherine Kelly Vidal
*Director of the United States Patent and Trademark Office*